US012618515B2

(12) United States Patent
Dean

(10) Patent No.: US 12,618,515 B2
(45) **Date of Patent: *May 5, 2026**

(54) ORGANIC COMPOSITE GAS STORAGE TANK

(71) Applicant: ROLLS-ROYCE plc, London (GB)

(72) Inventor: Eric W Dean, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,613

(22) Filed: May 23, 2023

(65) Prior Publication Data

US 2023/0288026 A1 Sep. 14, 2023

Related U.S. Application Data

(63) Continuation of application No. 17/450,519, filed on Oct. 11, 2021, now Pat. No. 11,719,386.

(30) Foreign Application Priority Data

Oct. 13, 2020 (GB) ..................................... 2016223

(51) Int. Cl.
*F17C 1/02* (2006.01)

(52) U.S. Cl.
CPC ............ *F17C 1/02* (2013.01); *F17C 2201/01* (2013.01); *F17C 2201/0109* (2013.01);
(Continued)

(58) Field of Classification Search
CPC ...... F17C 1/02; F17C 1/04; F17C 1/06; F17C 2201/0142; F17C 2203/0665;
(Continued)

(56) References Cited

U.S. PATENT DOCUMENTS 100,282 A 3/1870 Goodwyn
5,025,943 A * 6/1991 Forsman .................. F17C 1/16 220/589
(Continued)

FOREIGN PATENT DOCUMENTS

DE 2253023 A1 5/1974
DE 102014013249 A1 * 3/2016 ................ F17C 1/04
(Continued)

OTHER PUBLICATIONS

English Machine Translation of WO-2020026811-A1 (Year: 2020).*
(Continued)

*Primary Examiner* — Laura E. Parker
(74) *Attorney, Agent, or Firm* — OLIFF PLC

(57) ABSTRACT

An organic composite gas storage tank 100 comprises a hollow central portion 106 which is substantially cylindrical and formed integrally with first and second end portions 102, 104, and which defines a longitudinal tank axis 101. The first end portion 102 comprises a hollow truncated conical region 102A which meets the hollow central portion at a first end thereof, and a cylindrical region 102B which meets an end of the hollow truncated conical portion remote from the hollow central portion. An organic fibre winding 107 extends at least between axial positions which coincide with the hollow truncated conical region of the first end portion and the hollow central portion respectively. A hollow metal end-fitting 120 has a hollow truncated conical portion 124 embedded within the wall of the hollow truncated conical region of the first end portion, providing a long leakage path around the metal end-fitting.

12 Claims, 3 Drawing Sheets

(52) U.S. Cl.
CPC *F17C 2201/0147* (2013.01); *F17C 2203/012* (2013.01); *F17C 2203/0604* (2013.01); *F17C 2203/0621* (2013.01); *F17C 2203/0665* (2013.01); *F17C 2203/0673* (2013.01); *F17C 2221/012* (2013.01); *F17C 2260/036* (2013.01); *F17C 2270/01* (2013.01)

(58) Field of Classification Search
CPC ...... F17C 2203/0668; F17C 2203/0602; F17C 2201/0109; F17C 2203/012; F17C 2203/0604; F17C 2203/0621; F17C 2203/0673; F17C 2221/012; F17C 2260/036; F17C 2270/01; F17C 2203/0612
USPC ........................................................... 220/589
See application file for complete search history.

(56) References Cited

U.S. PATENT DOCUMENTS

| | | | | |
|---|---|---|---|---|
| 6,494,405 | B1 | 12/2002 | Kirn et al. | |
| 11,719,386 | B2 * | 8/2023 | Dean | F17C 1/16<br>220/589 |
| 2005/0260373 | A1 * | 11/2005 | DeLay | B29C 53/602<br>156/173 |
| 2010/0294776 | A1 | 11/2010 | Liu | |
| 2015/0240993 | A1 | 8/2015 | DeLay | |
| 2015/0316207 | A1 * | 11/2015 | Laney | F17C 1/00<br>427/236 |
| 2019/0277447 | A1 * | 9/2019 | Rocher | B29C 48/0015 |

FOREIGN PATENT DOCUMENTS

| | | | | |
|---|---|---|---|---|
| JP | 2013-015175 | A | 1/2013 | |
| JP | 2017-096371 | A | 6/2017 | |
| JP | 6659320 | B2 | 3/2020 | |
| WO | WO-2015197457 | A1 * | 12/2015 | F17C 13/06 |
| WO | WO-2020026811 | A1 * | 2/2020 | B29C 63/0004 |

OTHER PUBLICATIONS

English Machine Translation of WO-2015197457-A1 (Year: 2015).*
English Machine Translation of DE-102014013249-A1 (Year: 2016).*
Mar. 4, 2022 extended Search Report issued in European Patent Application No. 21196758.3.
Aug. 13, 2024 Office Action issued in U.S. Appl. No. 18/200,614.
Nov. 21, 2024 Notice of Allowance issued in U.S. Appl. No. 18/200,614.

* cited by examiner

ORGANIC COMPOSITE GAS STORAGE TANK

CROSS-REFERENCE TO RELATED PATENT APPLICATIONS

This application is a continuation application of U.S. application Ser. No. 17/450,519 filed Oct. 11, 2021, which in turn claims priority pursuant to 35 U.S.C. 119(a) to United Kingdom Patent Application No. 2016223.6, filed on Oct. 13, 2020. These prior applications are each incorporated herein by reference in its entirety.

BACKGROUND OF THE INVENTION

Technical Field

The present disclosure relates to gas storage tanks, particularly gas storage tanks for storing gas under high pressure, for example 500 bar or more, with high gravimetric efficiency.

Description of Related Art

Storage of gas within a storage tank at high gravimetric efficiency is a desirable technical goal in a number of applications. In the case of static storage of a gas within a gas storage tank, a high gravimetric efficiency corresponds to a relatively low tank mass per unit mass of stored gas (and hence efficient use of tank material) and tends to minimise the energy required to transport a unit mass of stored gas within the tank. Storage of gaseous hydrogen within storage tanks at high gravimetric efficiency and low absolute mass is particularly important in transport applications, especially aeronautical applications, for example where motive power is provided by hydrogen fuel cells (typically polymer electrolyte membrane (PEM) fuel cells) fueled by gaseous hydrogen stored in one or more storage tanks, or by combustion of hydrogen.

Organic composite tanks are frequently used in automotive applications due to their low mass, capability to withstand high pressure (several hundred bar) and hence potential for achieving storage of gaseous hydrogen at high gravimetric efficiency. FIG. 10 shows an organic composite tank 400 of the prior art. The tank 400 comprises a hollow cylindrical central section 406 formed integrally with two hollow hemispherical end portions 402, 404. Hoop strength is provided to the hollow cylindrical central section 406 by a helical hoop winding 421 comprising organic fibre, the planes of individual windings being perpendicular to the longitudinal axis of the hollow cylindrical central portion 406. Axial strength is provided to the hollow cylindrical central section 406 by second, high-angle, helical windings 423A, 423B of organic fibre, the planes of individual windings being inclined at around +/−50° to the longitudinal axis of the tank 400. Low-angle windings 425A, 425B add strength to the hemispherical end portions 402, 404, the planes of individual windings of the low-angle windings 425A, 425B being inclined at a small angle to the longitudinal axis of the cylindrical section 406. In order to increase the maximum pressure at which gas (e.g. gaseous hydrogen) can be stored in the tank 400 beyond around 700 bar, typically the wall thickness of the hemispherical end portions 402, 404 is increased, thus increasing the mass of the tank 400. Additionally or alternatively, further low-angle windings such as 425A, 425B may be applied to the tank 400, however there are practical limitations to the number of low-angle windings which can be applied. Further low-angle windings also add weight to the tank 400. The potential for increasing the maximum pressure of stored gas within the tank 400 without adversely impacting its gravimetric efficiency is therefore limited in the case of the tank 400 which is based on a standard configuration comprising a cylindrical central portion and hemispherical end portions.

BRIEF SUMMARY

According to an example, an organic composite gas storage tank comprises a hollow central portion which is substantially cylindrical and formed integrally with first and second end portions and which defines a longitudinal tank axis, the first end portion comprising (a) a hollow truncated conical region which meets the hollow central portion at a first end thereof, the outer and inner radii of the hollow truncated conical region decreasing in a direction along the longitudinal tank axis away from the hollow central portion; and (b) a cylindrical region which meets an end of the hollow truncated conical portion remote from the hollow central portion of the tank, wherein the tank further comprises (i) a hollow metal end-fitting having a hollow cylindrical portion the outer surface of which is in contact with the inner surface of the cylindrical region of the first end portion, and a hollow truncated conical portion extending from the hollow cylindrical portion towards the hollow central portion of the tank, the hollow truncated conical portion of the metal end-fitting being embedded within the wall of the hollow truncated conical region of the first end portion; and (ii) an organic fibre winding extending at least between first and second positions along the length of the tank which coincide with the hollow truncated conical region of the first end portion and the hollow cylindrical portion respectively, the organic fibre winding having windings in planes which are inclined to the longitudinal tank axis.

The hollow truncated conical region of the first end portion provides for the axial strength of the tank at the first end portion to be increased beyond that of a prior art tank having a hemispherical first end portion and multiple low-angle organic fibre windings, without the need for additional organic fibre windings other than a single, high-angle winding. Furthermore, a tank of the invention provides a long leakage path for gas stored in the tank, the leakage path extending around the hollow truncated conical portion of the end-fitting.

The wall thickness of the hollow truncated conical region of the first end portion, defined at a given position along the longitudinal tank axis by the difference between the outer and inner radii of the tank at that position, may decrease in a direction along the longitudinal tank axis away from the hollow central portion. This may provide the truncated conical region of the first end portion with a hoop strength which is constant along its length whilst simultaneously allowing a weight reduction compared to case where the wall thickness has a constant value along its axial length.

The hollow central portion may comprise first and second hollow truncated conical portions, the external radius of a given hollow truncated conical portion decreasing in a direction towards a corresponding end portion, and an organic composite fibre winding extending between first and second positions along the length of the tank which coincide with the first and second hollow truncated conical portions of the hollow central portion respectively, the organic composite fibre winding having windings in planes which are inclined to the longitudinal tank axis. This arrangement provides additional axial strength to the hollow central portion since the first and second hollow conical portions are biased together by the organic composite fibre winding.

The tank may further comprise a polymer liner in contact with the internal surface of the tank, in order to mitigate leakage of gas from the tank.

The hollow truncated conical region of the first end portion may have a semi-vertical angle less than or equal to 450.

The ratio of the length of the hollow central portion to the maximum external diameter of the hollow central portion may be at least 10, preferably at least 20, or more preferably at least 50.

The tank (not including any liner) may be formed of a laminate material.

Loops of the organic fibre winding are preferably inclined to the longitudinal tank axis at an angle between 45° and 60°.

BRIEF DESCRIPTION OF THE SEVERAL VIEWS OF THE DRAWINGS

Examples are described below with reference to the accompanying drawings in which.

DETAILED DESCRIPTION

Figure 1:
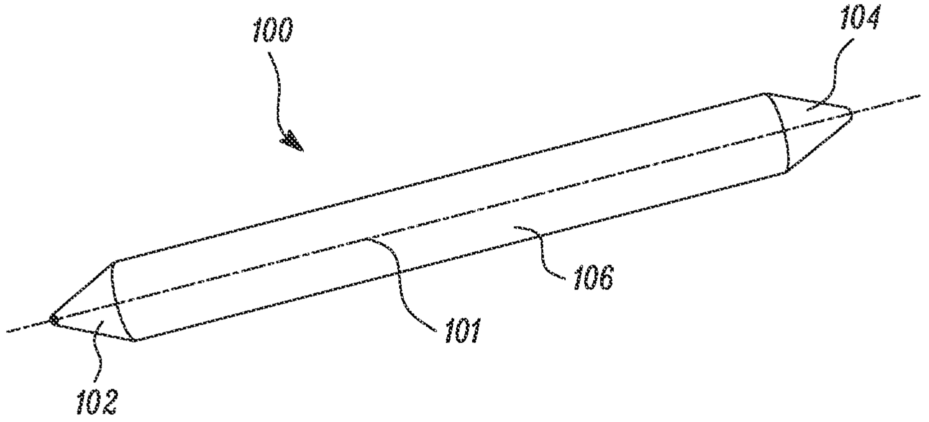
FIG. 1 shows a perspective view of an organic composite gas storage tank according to a first example of the invention.
Figure 2:
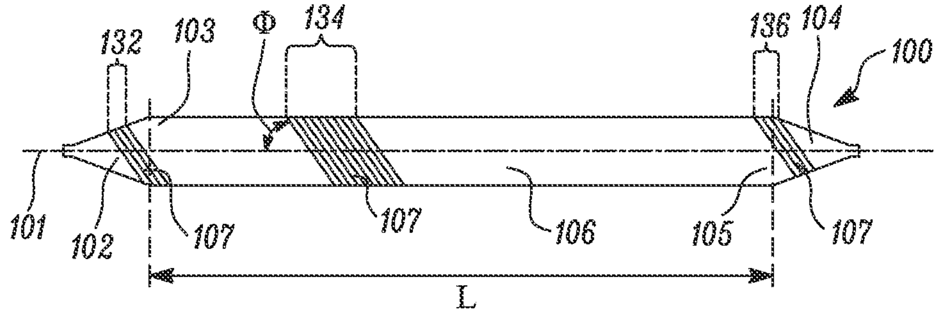
FIG. 2 shows a side view of the FIG. 1 tank.
Figure 3:
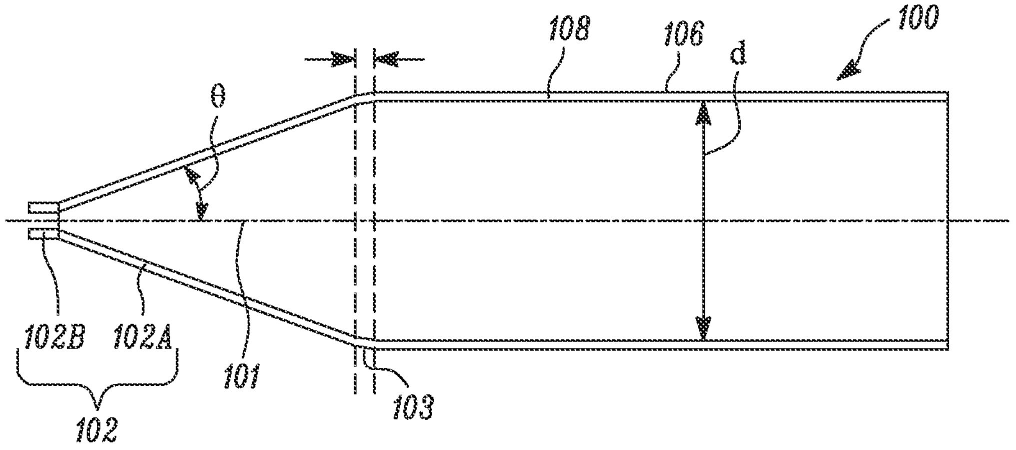
FIG. 3 shows a portion of a cross-section of the FIG. 1 tank, in a plane including the central longitudinal axis of the tank.

Referring to FIGS. 1 to 3, an organic composite storage tank 100 of the invention comprises a hollow central portion 106 formed integrally with first and second end portions 102, 104, the hollow central portion 106 and the end portions 102, 104 having a laminar construction The hollow central portion 106 defines a longitudinal tank axis 101 and is cylindrical with respect to the axis 101 over most of its length, except for short terminal lengths 103, 105 over which the inner and outer radii of the of the hollow central portion decrease smoothly to meet the end portions 102, 104 respectively. The hollow central portion 106 is therefore substantially cylindrical. The first end portion 102 has a hollow truncated conical portion 102A and a cylindrical portion 102B which meets the hollow truncated conical portion 102A at the smaller-diameter end thereof. The larger-diameter end of the hollow truncated conical portion 102A meets the hollow central portion 106 at the terminal length 103 of the hollow central portion 106. The second end portion 104 is identical to the first end portion 102 and meets the terminal length 105 of the hollow central portion 106 at an end thereof remote from the terminal length 103.

Figure 10:
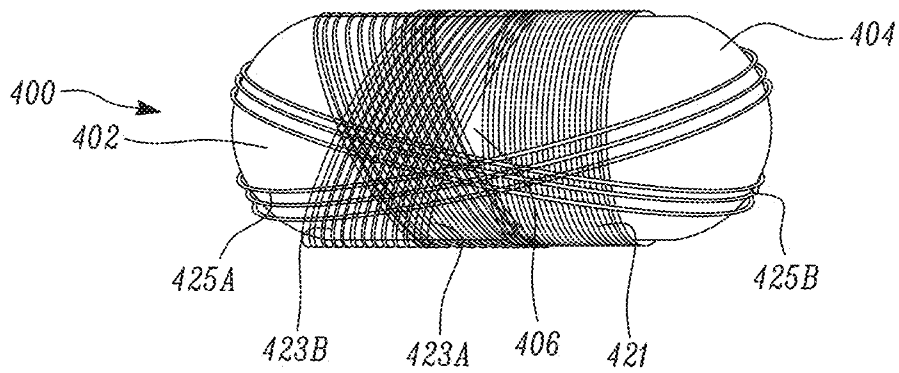
Prior Art FIG. 10
FIG. 10 is an organic composite tank 400 of the prior art.

The organic composite tank 100 further comprises an organic fibre filament winding 107 which is wound onto the external surface of the tank 100 and which extends substantially over the whole length of the tank 100. In the interests of clarity, FIG. 2 only shows three portions 132, 134, 136 of the organic fibre filament winding 107. The planes of individual loops of the organic fibre winding 107 are inclined to the longitudinal tank axis 101 and an angle indicated by $\phi$ in FIG. 2. The portion of the organic fibre filament winding 107 which extends along the hollow cylindrical portion 106 of the tank 100 provides a force having a component at any given position along the longitudinal tank axis 101 directed radially inwardly to towards the axis 101, thus contributing to the strength of the hollow cylindrical portion 106 and improving the ability of the tank 100 to store gas at high pressure. At each end of the tank 100, the organic fibre filament winding 107 extends from an end portion 102, 104, over a terminal length 103, 105 of the hollow cylindrical portion 106 and onto the main cylindrical part of the hollow cylindrical portion 106. Since the surfaces of the truncated conical portions, such as 102A, of the end portions 102, 104 are inclined to the longitudinal tank axis 101, tension in the organic fibre filament winding 107 produces a force on each of the end portions 102, 104 in the direction of the hollow central portion 106. The end portions 102, 104 of the tank 100 are thus biased towards the hollow central portion 106 without the need for a complex system of multiple windings as is needed when attempting to increase the strength of a conventional organic composite tank having hemispherical end portions at either end of a cylindrical central portion (as shown in FIG. 10). Elimination of the requirement for axial fibres wrapped around hemispherical end portions, as in the prior art, allows more flexibility in fibre architecture, allowing it to be optimised for minimum weight.

The semi-vertical angle of the truncated conical portions of the end portions 102,104 is indicated by $\theta$ in FIG. 3. The hollow central portion 106 has a total length L (including the lengths of the short terminal portions 103, 105). The internal diameter of the hollow central portion 106 of the tank 100 is d. The wall 108 of the tank 100 has a thickness t which is constant over the length of the tank 100. In one example, L=5.1 m, d=0.5 m, t=12 mm, $\theta$=45° and $\phi$=±55°, however these parameters may vary in order to optimise various aspects of the design of the tank 100. For a given internal diameter d, preferably $\theta$ is as high a possible, consistent with allowing individual loops of the organic fibre filament winding 107 to be accurately located and maintained in position on the truncated conical portions of the end portions 102, 104, since this minimises the length and hence the weight of the truncated conical portions. For a given value of $\theta$, the internal diameter d of the hollow central portion 106 is preferably as small as possible in order to minimise the length of the truncated conical portions of the end portions 102, 104. For L=5.1 m and d=0.5 m, the hollow cylindrical portion 106 has an aspect ratio L/d of 10.2 and an internal volume of approximately 1 $m^3$. In order to reduce the length of the end portions 102, 104 as a proportion of the total length of the tank 100, the aspect ratio of the hollow cylindrical portion 106 may be greater than 10.2, for example 20 or more, or 50 or more. To produce a higher tank volume, it is preferable to increase the length L of the hollow cylindrical portion 106 rather than its internal diameter d, so that the volumes of the end portions 102, 104 represent a smaller fraction of the total internal volume of the tank 100.

Figure 4:
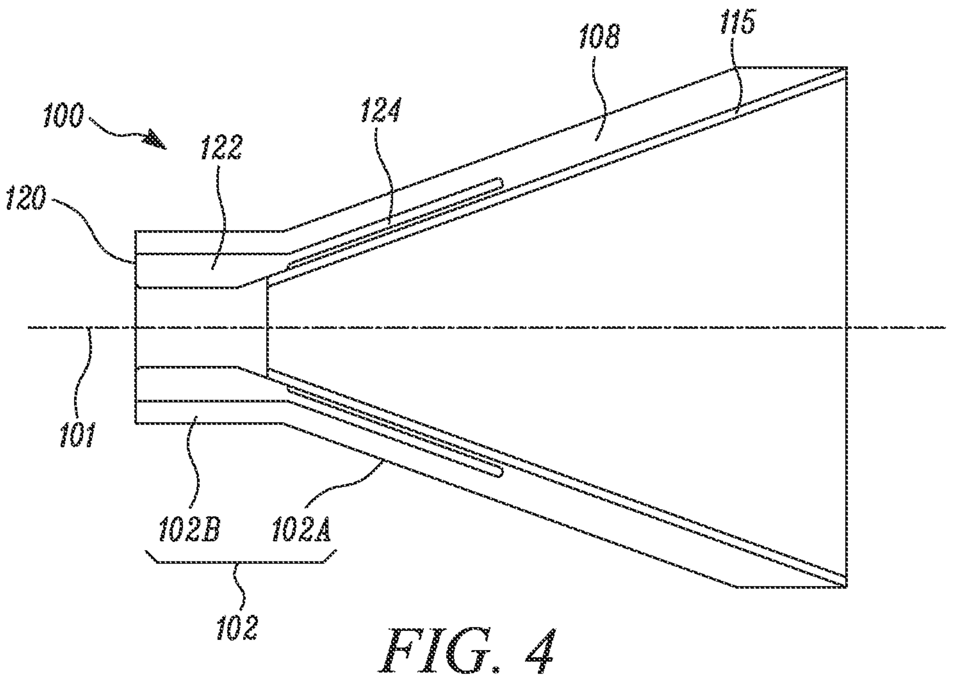
FIG. 4 shows a cross-section of an end portion of the FIG. 1 tank, in a plane including the central longitudinal axis of the tank.
Figure 5:
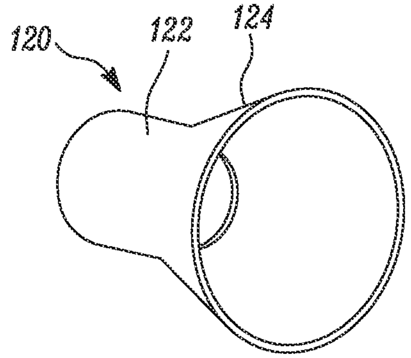
FIG. 5 shows a first perspective view of a metal fitting comprised in the FIG. 1 tank.
Figure 6:
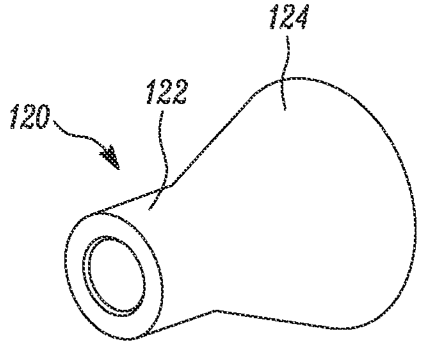
FIG. 6 shows a second perspective view of the metal fitting of FIG. 5.

Referring to FIG. 4, the tank 100 further comprises an internal polymer liner 115 which lines the internal surfaces of the hollow cylindrical portion 106 and the truncated conical portions of the end portions 102, 104 and which mitigates or prevents leakage of gas (for example gaseous hydrogen) stored within the tank 100, The tank 100 further comprises a metal end fitting 120 having a cylindrical portion 122 fitting within the cylindrical portion 102B of the end portion 102 of the tank 100, and a hollow truncated conical portion 124 extending away from the cylindrical portion 122 towards the cylindrical portion 106 of the tank 100. The truncated conical portion 124 of the metal end fitting 124 is embedded within the wall 108 of the tank 100, i.e. within the truncated conical portion 102A of the end portion 102. This arrangement provides a long leakage path for gas stored within the tank, the leakage path extending around the truncated conical portion 124 of the metal end fitting 120 and out of the tank via a path between the external surface of the cylindrical portion 122 of the metal end fitting 120 and the internal surface of the cylindrical portion 102B of the end portion 102. The end portion 104 of the tank 100 is provided with a similar metal fitting. FIGS. 5 and 6 show perspective views of the metal end fitting 120. The internal surface of the cylindrical portion 122 of the metal fitting 120 may be provided with a screw thread to allow connection of an output pipe, flow valve etc. In a variant of the tank 100, one end portion may have the form of a closed cone, without a terminal cylindrical portion such as 102B or a metal end fitting such as 120.

Figure 7:
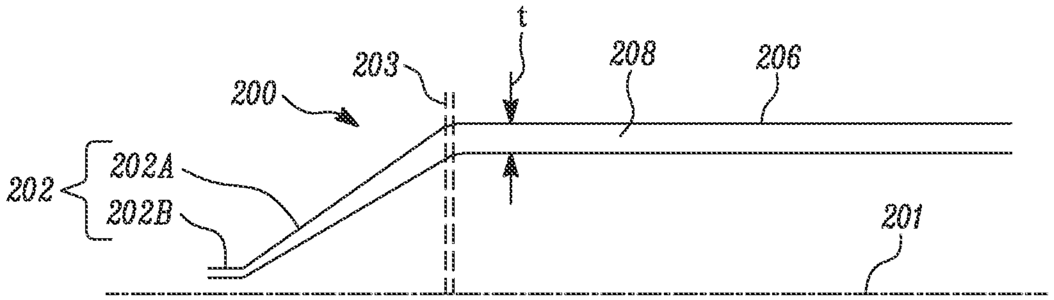
FIG. 7 illustrates variation in the wall thickness of a second example organic composite gas storage tank of the invention.

FIG. 7 shows a schematic view of part of the wall 208 of a second example organic composite tank 200 of the invention, the tank 200 having a similar construction to the tank 100 of FIGS. 1 to 4. The example tank 200 has a substantially cylindrical hollow central portion 206 (defining a longitudinal tank axis 201) formed integrally with end portions, such as 202, each of which meets the central portion 106 at a respective terminal portion thereof, such as 203. An end portion 202 comprises a truncated conical portion 202A and a cylindrical portion 202B, The wall 208 of the tank 200 has a thickness at a given longitudinal position along the axis 201 defined by the difference between the outer and inner radii of the tank 200 at that longitudinal position. The thickness of the wall 208 of the tank 200 has a substantially constant value t over the length of the hollow cylindrical portion 206. The thickness of the wall 208 decreases from the value t over the axial extent of the truncated conical portion 202A of end portion 202 in an axial direction away from the hollow central portion 206. The reduction in the thickness of the wall 208 within the end portion 202 provides for a constant hoop strength over the axial extent of the end portion 202, whilst simultaneously providing a weight reduction compared to a case where the thickness of wall 208 is constant over the axial extent of the truncated conical portion 202A. The thickness of wall 208 may taper in this way in the case of either end portion, or both end portions, of the tank 200.

Figure 8:
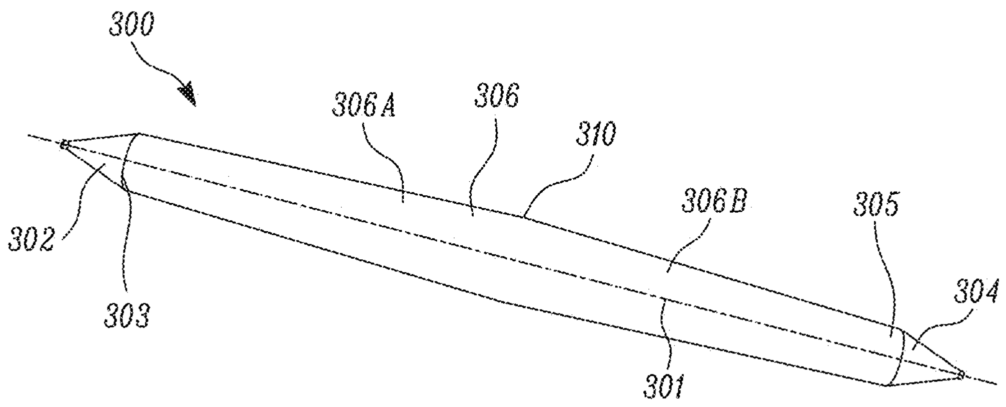
FIG. 8 shows a perspective view of a third example organic composite gas storage tank of the invention.
Figure 9:
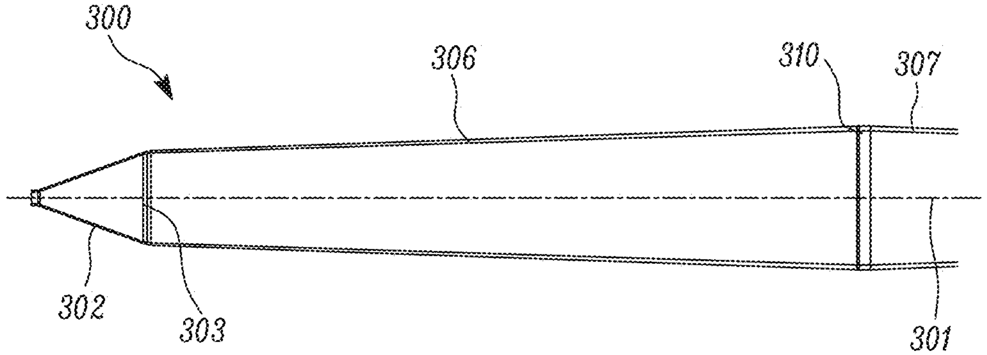
FIG. 9 is a portion of a cross-section of the FIG. 9 tank in a plane including the central longitudinal axis of the tank.

Referring to FIGS. 8 and 9, a third example organic composite gas storage tank 300 has a substantially cylindrical hollow central portion 306 comprising first and second truncated hollow conical portions 306A, 306B each having a small semi-vertical angle in the range 1° to 10°, formed integrally with end portions 302, 304. The larger-diameter ends of portions 306A, 306B are connected by a short connecting portion 310. End portion 302 is connected at its larger-diameter end to the smaller-diameter end of portion 306A via a short connecting portion 303; similarly end portion 304 is connected to portion 306B via a short connecting portion 305. The outer radius of the tank 300, with respect to axis 301, changes smoothly over the connecting portions 303, 305, 310. The tank 300 has a central longitudinal axis 301. End portions 302, 304 each comprise a respective truncated hollow conical portion connected to a hollow cylindrical portion, as shown in FIG. 3 in the case of the tank 100 and are each provided with a metal end fitting similar to the fitting 120 of the tank 100 of FIGS. 1-4. The tank 300 also comprises a polymer liner similar to the liner 115 of the tank 100. The tank 300 further comprises an organic fibre filament winding (not shown in FIG. 8 or 9) similar to the winding 107 of the tank 100 extending over substantially the whole length of the tank 309. Individual planes of the organic filament winding are inclined at angle of approximately 55° to the central longitudinal axis 301 of the tank 300. Since portions 306A, 306E are slightly conical in shape, the portion of the organic filament winding which extends over the portions 306, 307 biases these portions together thus providing additional axial strength compared to the tank 100 of FIG. 1-4, The organic filament winding also biases each end portion 302, 304 axially towards the truncated conical portion 306A, 306B to which it is connected.

What is claimed is:

1. An organic composite gas storage tank comprising a hollow central portion formed integrally with first and second end portions and which defines a longitudinal tank axis, the first end portion comprising:

(a) a hollow truncated conical region comprised of a wall of a single internal wall material which meets the hollow central portion at a first end thereof, the outer and inner radii of the hollow truncated conical region decreasing in a direction along the longitudinal tank axis away from the hollow central portion; and (b) a cylindrical region which meets an end of the hollow truncated conical region remote from the hollow central portion of the tank, wherein the tank further comprises:

(i) a hollow metal end-fitting having a hollow cylindrical portion and a hollow truncated conical portion extending from the hollow cylindrical portion towards the hollow central portion of the tank, the radially outer surface of the hollow cylindrical portion being in contact with the radially inner surface of the cylindrical region of the first end portion, and the radially inner surface of the hollow cylindrical portion being at least in part in contact with stored gas in use of the tank, the hollow truncated conical portion of the metal end-fitting being embedded within the single internal wall material of the wall of the hollow truncated conical region of the first end portion such that both radially outer and radially inner surfaces of the hollow truncated conical portion of the metal end-fitting contact the single internal wall material of the wall of the hollow truncated conical region of the first end portion, the first end portion of the tank and the metal end-fitting forming a single continuous leakage path of the tank from the interior to the exterior thereof by (a) contact of the hollow truncated conical portion of the metal end-fitting with internal material of the wall of the hollow truncated conical region of the first end portion and (b) contact of the radially outer surface of the hollow cylindrical portion of the metal end-fitting with the radially inner surface of the cylindrical region of the first end portion; and (ii) an organic fiber winding extending at least between first and second positions along the length of the tank which coincide with the hollow truncated conical region of the first end portion and the hollow cylindrical portion respectively, the organic fiber winding having windings in planes which are inclined to the longitudinal tank axis.

2. An organic composite gas storage tank according to claim 1 wherein the hollow truncated conical region of the first end portion has a wall thickness, defined at a given position along the longitudinal tank axis by the difference between the outer and inner radii of the tank at that position, which decreases in a direction along the longitudinal tank axis away from the hollow central portion.

3. An organic composite gas storage tank according to claim 1 wherein the hollow central portion comprises first and second hollow truncated conical portions, the external radius of each hollow truncated conical portion of the hollow central portion decreasing in a direction towards a corresponding end portion, and wherein the tank comprises an organic composite fiber winding extending along the length of the tank over the first and second hollow truncated conical portions of the hollow central portion, the organic composite fiber winding having windings in planes which are inclined to the longitudinal tank axis.

4. An organic composite gas storage tank according to claim 1 further comprising a polymer liner in contact with an internal surface of the tank.

5. An organic composite gas storage tank according to claim 1 wherein the hollow truncated conical region of the first end portion has a semi-vertical angle less than or equal to 45°.

6. An organic composite gas storage tank according to claim 1 wherein a ratio of a length of the hollow central portion to a maximum external diameter of the hollow central portion is at least 10.

7. An organic composite gas storage tank according to claim 1 wherein a ratio of a length of the hollow central portion to a maximum external diameter of the hollow central portion is at least at least 20.

8. An organic composite gas storage tank according to claim 1 wherein a ratio of a length of the hollow central portion to a maximum external diameter of the hollow central portion is at least 50.

9. An organic composite gas storage tank according to claim 1 wherein the tank comprises a laminate material.

10. An organic composite gas storage tank according to claim 1 wherein loops of the organic fiber winding are inclined to the longitudinal tank axis at an angle between 45° and 60°.

11. An organic composite gas storage tank according to claim 1 wherein the hollow central portion is cylindrical.

12. An organic composite gas storage tank according to claim 1 wherein no portion of the hollow cylindrical portion of the metal end-fitting extends towards the hollow central portion of the tank past a point where the hollow cylindrical portion of the metal end-fitting joins the hollow truncated conical portion.

* * * * *